F. M. SLOUGH.
ELECTRIC SYSTEM.
APPLICATION FILED JULY 13, 1912.
1,204,600.
Patented Nov. 14, 1916.
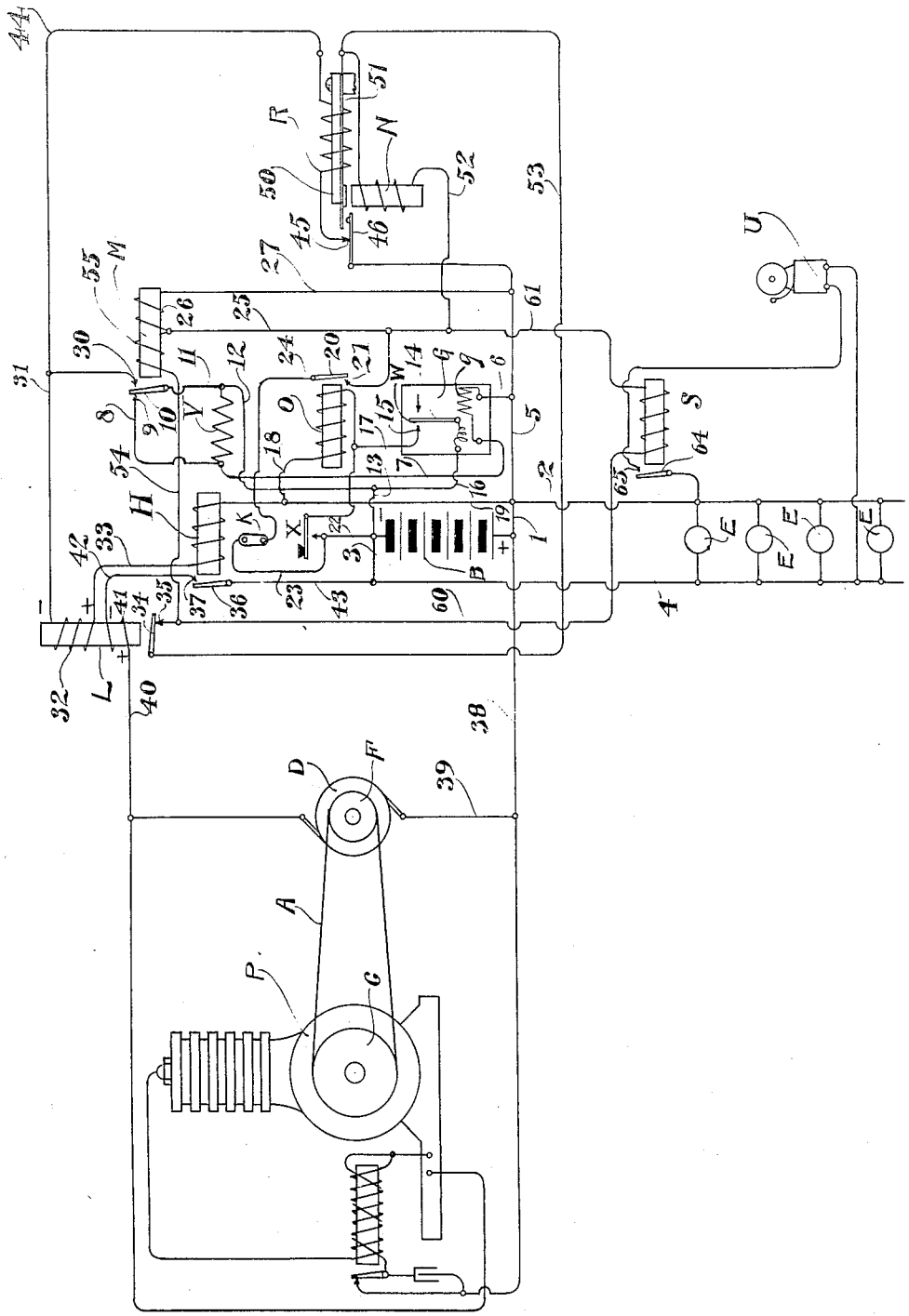
Witnesses
Edgar A. Spurr
Meta Schmittberger
Inventor
Frank M. Slough
By F. O. Richey
His Attorney

UNITED STATES PATENT OFFICE.

FRANK M. SLOUGH, OF ELYRIA, OHIO, ASSIGNOR TO THE GARFORD MANUFACTURING COMPANY, OF ELYRIA, OHIO, A CORPORATION OF OHIO.

ELECTRIC SYSTEM.

1,204,600.

Specification of Letters Patent.

Patented Nov. 14, 1916.

Application filed July 18, 1912. Serial No. 709,137.

*To all whom it may concern:*

Be it known that I, FRANK M. SLOUGH, a citizen of the United States, residing at Elyria, in the county of Lorain and State of Ohio, have invented certain new and useful Improvements in Electric Systems; and I do hereby declare the following to be a full, clear, and exact description of the invention, such as will enable others skilled in the art to which it appertains to make and use the same.

My invention relates to electric systems, and especially to systems adapted for use in isolated places or in places where the attendant is partially or totally unskilled in the art of managing such plants. For example, in lighting systems adapted to be used at country residences, or upon farms or other isolated places where there is no attendant, or where those overseeing the operation of the plant are unskilled in the handling of such apparatus, I aim to make the operation of the plant automatic, so that the only attention required will be the supply of fuel to the prime mover and of such other attentions as are required to keep the apparatus in working order.

In general, my invention relates to improvements in the system illustrated, described and claimed in my application #704,505, filed June 19th, 1912, such application describing the needs of such a system and the faults of the systems constituting the prior art.

The object of my invention and the invention itself will be better understood from a description of the embodiment illustrated in the drawing.

The figure illustrates an embodiment of my invention.

Referring now to the drawing and to the particular embodiment of my invention illustrated therein, at P is shown a prime mover and at D a source of current for charging an accumulator B. The source of current D may consist of a dynamo electric machine, and the accumulator B of a storage battery. I prefer to use a gas or gasolene engine as the prime mover.

At E are shown a number of electro-responsive devices, such as incandescent lamps, which are adapted to be energized by current from the accumulator B. When the accumulator is first connected to the dynamo, the same is driven as a motor by the current from the battery, and when so driven, starts the prime mover through some power transmitting means, such as pulleys C and F and an interconnecting belt A. When once started, the prime mover will actuate the dynamo, which will generate current to charge the accumulator.

At G I show an electro-responsive device, which may be a voltmeter or other suitable device of this character.

H, L, M, N and O are circuit controlling means, such as electro-magnets, whose functions will be described in the description of the operation.

R is an element which operates only after a certain length of time, such as a thermal device, here shown as consisting in part of a winding of high resistance. S is another relay whose functions will be described in the description of the operation and U is a special signal device.

The embodiment of my invention and the various parts thereof, as well as other functions will be clear from a description of the operation which is as follows:—The accumulator B will be normally connected to the electro-responsive devices E through the conductors 1, 2, 3 and 4, whereby they will be actuated when turned on. The electro-responsive device G is normally connected across the battery through the conductors 1—5—6—7—8—contact 9—armature 10—conductors 11—12 and 13. The member 14, which is here shown as a movable needle, will be moved in response to the condition of the charge in the accumulator, such as for example, the variations of the voltage therein, and will be so arranged that for a predetermined condition the member 14 will engage the contact 15, closing a switch W. This completes a circuit as follows:—negative pole of battery—13—16—14—15—17—relay O—18—19—1 to positive pole of battery, energizing the relay O, which draws up the armature 20, closing a switch 20—21 and thereby a circuit as follows:—negative pole of battery—22—23—switch K—24—20—21—25—coil 26 of relay M—27—conductor 5 to positive pole of battery. The winding 26 being energized, the armature 10 is attracted, interrupting the shunt 8—11 about the resistance V, and throwing said resistance in circuit with the winding g of the device G. Owing to this change in condition, the switch W will be closed all the tighter and the condition will be such that a substantial change must be made in the condition of the charge of the battery before the switch W will be opened again. For example, if the device G consists of a voltmeter or other current actuated device, the resistance V being thrown into circuit with the device G, the current flowing therefrom will be considerably less than when the device V is shunted and the needle 14 will be thrown nearer or harder toward the zero point. The object of this will be described later. The armature 10 will engage the front contact 30, completing a circuit as follows:—negative pole of battery—13—12—11—10—30—31—winding 32 of the relay L—33—relay H—conductor 19—1 to the positive pole of the battery, energizing both the relays L and H. The energization of the relay L, however, will not be sufficient for it to attract its armature 34, so that the switch 34—35 will remain closed. The relay H, however, attracts its armature 36, closing the switch 36—37 and connecting the accumulator to the source D through the following circuit:—positive pole of battery —38—39—D—40—winding 41 of relay L— 42—37—36—43—3—to negative pole of battery.

When the armature 10 was pulled up, a circuit was completed through the device R as follows:—negative pole of battery—13— 12—11—10—30—44—R—45—46—5 to positive pole of battery. The current heats up the winding, which heats up the two pieces of substance 50 and 51, whose coefficients of expansion are different, so that in heating the bar will bend toward the electromagnet end in the well known manner. After a predetermined time, the bar 51 engages the member 46, interrupting the circuit 45—46 and closing the switch 46—51. In the meantime, current will be flowing from the accumulator B through the winding 41 of the relay L to the source D, energizing the same and operating it as a motor to start the prime mover. Current flowing in this direction will act differentially to the current in the winding 32, so that the armature 34 will not be attracted. If, however, the prime mover starts the dynamo electric machine and the same begins to charge the accumulator, the current through the winding 41 will be reversed, acting accumulatively with the current through the winding 32 and attracting the armature 34 to open the switch 34—35. Should the dynamo electric machine D fail to start the engine before the time required for the action of the device R, which may be any value predetermined, a circuit will be completed as follows, upon the closing of the switch 46—50 of the device R:—positive pole of battery—1—5— 46—51—N—52—21—20—24—K—23—22— to negative pole of battery, energizing the magnet N and locking the switch 46—50. A circuit will also be completed from the positive pole of battery—1—5—46—51—53—34 —35—54—winding 55 of the magnet N—25 —21—20—24—K—23—22—to negative pole of battery. The current in the windings 55 and 26 will act differentially, neutralizing the effect of each other, so that the armature 10 drops back, closing the switch 9—10 and interrupting the circuit of the relay H, which will let go its armature, disconnecting the accumulator from the dynamo electric machine D and preventing the useless effort of the accumulator and the dynamo to start an inoperative engine, thereby saving energy and wear and tear upon the system, which frequently results in serious damage thereto. At the same time, a circuit will be closed through the relay S as follows:—positive pole of battery—5—46— 51—53—34—35—60—S—61—21—20—24— K—23—22—to negative pole of battery B, so that the relay S will be energized, pulling up the armature 64 and closing a switch 64—65 in the circuit of the alarm device U, which being now bridged across the mains 2 and 4, will be operated, notifying the farmer or other attendant that the engine is inoperative. The attendant will then supply additional fuel to the engine or take other steps to place it in operative condition, after which he operates the key K, interrupting the circuit of the relays S, N and M and restoring the condition of the system to normal, whereupon the cycle will be completed with the exception that this time the machine D will start the engine and the dynamo will begin to charge the accumulator before the device R is operated, opening the switch 34 and 35 through the accumulative action of the windings of the relay L with the result that the differential winding of the relay M will not be energized, since its circuit will be interrupted at the switch 35—34. As the charging proceeds, the condition of the charge of the battery changes until it has become such, (and this condition may be predetermined) that the switch W is broken, interrupting the circuit of the relay O, which interrupts the circuits of other relays, restoring the condition to normal and shunting the resistance device V. Again, upon the shunting of this device, the conditions in the circuit of the device G will be such that there will be a wide separation between the contacts 14 and 15 of the switch 14. This separation being wide, it will be considerable time before the switch W is operated again.

It frequently happens that the farmer does not desire that the machine shall be operated at a certain time, for instance after he has retired, so that he desires to control the system manually. This may be accomplished by operating the switch X, which closes contacts in parallel with the contacts 14 and 15, starting the operation of the system, which, after it has once been started, will act automatically in the way described.

While I have shown a voltmeter at G, it will be apparent that any suitable device may be employed and that any suitable time acting element or any device which requires a certain period of time for its operation may be used at R. In fact, it will be obvious to those skilled in the art that numerous and extensive departures may be made from the form and details of the embodiment disclosed without departing from the spirit of the invention. I have disclosed this embodiment simply for the purpose of clearly illustrating my invention.

I claim:—

1. In an electric system, the combination of an accumulator, means for charging said accumulator, circuit conductors for connecting said accumulator and said charging means, a relay controlling said circuit conductors, a circuit for said relay, an electro-responsive device responsive to the condition of the charge of said accumulator controlling the circuit of said relay, a current modifying device in the circuit of said responsive device, means for effectively removing said current modifying device from said circuit, mechanism controlling said means and means responsive to the operative or inoperative condition of the charging means controlling said last named means.

2. In an electric system, the combination of an accumulator, a dynamo electric machine for charging said accumulator, a prime mover adapted to drive said dynamo electric machine, said prime mover adapted to be started by said dynamo electric machine when said machine is operated by current from said accumulator, means for connecting said accumulator to said dynamo electric machine when the charge of said accumulator reaches a predetermined condition, a relay controlling said means and a differential winding upon said relay controlling the disconnection of said accumulator from said machine, said differential winding being energized when said prime mover is inoperative.

3. In an electric system, the combination of an accumulator, means for charging said accumulator, mechanism responsive to the condition of the charge of said accumulator controlling the connection of said accumulator to said means, a relay controlling said mechanism, a differential winding upon said relay controlling the disconnection of said accumulator from said charging means and means automatically actuating after a predetermined length of time, means controlling the energization of said differential winding.

4. In combination, a dynamo-electric machine, an accumulator, a circuit for connecting said accumulator to said dynamo-electric machine, an electric switch controlling said circuit, a voltmeter relay controlling said switch and including electromagnetic means and an electric switch, a spring normally tending to close said switch and restrained therefrom by said electromagnetic means, said electromagnetic means being responsive to the condition of the charge of said accumulator and means for diminishing the control of said last named switch by said electromagnetic means, operable when said switch is closed.

In testimony whereof, I affix my signature in the presence of two witnesses.

FRANK M. SLOUGH.

Witnesses:
EDGAR A. SPURR,
F. O. RICHEY.